(12) United States Patent
Wu et al.

(10) Patent No.: US 12,148,444 B2
(45) Date of Patent: *Nov. 19, 2024

(54) SYNTHESIZING SPEECH FROM TEXT USING NEURAL NETWORKS

(71) Applicant: Google LLC, Mountain View, CA (US)

(72) Inventors: Yonghui Wu, Fremont, CA (US); Jonathan Shen, Santa Clara, CA (US); Ruoming Pang, New York, NY (US); Ron J. Weiss, New York, NY (US); Michael Schuster, Saratoga, CA (US); Navdeep Jaitly, Mountain View, CA (US); Zongheng Yang, Berkeley, CA (US); Zhifeng Chen, Sunnyvale, CA (US); Yu Zhang, Mountain View, CA (US); Yuxuan Wang, Sunnyvale, CA (US); Russell John Wyatt Skerry-Ryan, Mountain View, CA (US); Ryan M. Rifkin, Oakland, CA (US); Ioannis Agiomyrgiannakis, London (GB)

(73) Assignee: Google LLC, Mountain View, CA (US)

( * ) Notice: Subject to any disclaimer, the term of this patent is extended or adjusted under 35 U.S.C. 154(b) by 813 days.

This patent is subject to a terminal disclaimer.

(21) Appl. No.: 17/222,736

(22) Filed: Apr. 5, 2021

(65) Prior Publication Data
US 2021/0295858 A1 Sep. 23, 2021

Related U.S. Application Data

(63) Continuation of application No. 16/058,640, filed on Aug. 8, 2018, now Pat. No. 10,971,170.

(51) Int. Cl.
G10L 13/047 (2013.01)
G06N 3/045 (2023.01)
(Continued)

(52) U.S. Cl.
CPC .............. *G10L 25/30* (2013.01); *G06N 3/045* (2023.01); *G06N 3/08* (2013.01); *G06N 5/046* (2013.01);
(Continued)

(58) Field of Classification Search
CPC ................................ G10L 13/08; G10L 25/30
See application file for complete search history.

(56) References Cited

U.S. PATENT DOCUMENTS 8,527,276 B1 9/2013 Senior et al.
10,186,251 B1 1/2019 Mohammadi
(Continued)

FOREIGN PATENT DOCUMENTS

WO WO2018048934 3/2018

OTHER PUBLICATIONS

Hu, Ya-Jun, et al. "The USTC system for blizzard challenge 2017." Proc. Blizzard Challenge Workshop. 2017.*
(Continued)

*Primary Examiner* — Paras D Shah
(74) *Attorney, Agent, or Firm* — Fish & Richardson P.C.

(57) ABSTRACT

Methods, systems, and computer program products for generating, from an input character sequence, an output sequence of audio data representing the input character sequence. The output sequence of audio data includes a respective audio output sample for each of a number of time steps. One example method includes, for each of the time steps: generating a mel-frequency spectrogram for the time step by processing a representation of a respective portion of the input character sequence using a decoder neural network; generating a probability distribution over a plurality of possible audio output samples for the time step by processing the mel-frequency spectrogram for the time step using a vocoder neural network; and selecting the audio
(Continued)

output sample for the time step from the possible audio output samples in accordance with the probability distribution.

20 Claims, 5 Drawing Sheets

(51) Int. Cl.
*G06N 3/08* (2023.01)
*G06N 5/046* (2023.01)
*G06N 7/01* (2023.01)
*G10L 13/08* (2013.01)
*G10L 25/18* (2013.01)
*G10L 25/30* (2013.01)

(52) U.S. Cl.
CPC .............. *G06N 7/01* (2023.01); *G10L 13/047* (2013.01); *G10L 13/08* (2013.01); *G10L 25/18* (2013.01)

(56) References Cited

U.S. PATENT DOCUMENTS

| | | |
|---|---|---|
| 10,186,252 B1 | 1/2019 | Mohammadi |
| 10,304,477 B2 | 5/2019 | Van Den Oord et al. |
| 2018/0336880 A1 | 11/2018 | Arik et al. |
| 2019/0122651 A1 | 4/2019 | Arik et al. |
| 2019/0180732 A1 | 6/2019 | Ping et al. |
| 2019/0251952 A1 | 8/2019 | Arik et al. |
| 2019/0355347 A1 | 11/2019 | Arik et al. |

OTHER PUBLICATIONS

Al-Radhi, Mohammed Salah, Tamás Gábor Csapó, and Géza Németh. "Deep Recurrent Neural Networks in speech synthesis using a continuous vocoder." International Conference on Speech and Computer. Springer, Cham, 2017.*
Arik et al. "Deep Voice: Real-Time Neural Text-to-Speech," arXiv 1702.07825, Mar. 7, 2017, 17 pages.
Arik et al. "Deepvoice 2: multi-speaker neural text to speech," arXiv1705.08947v2, Sep. 20, 2017, 15 pages.
Bahdanau et al. "Neural machine translation by jointly learning to align and translate," arXiv1409.0473, Sep. 1, 2014, 15 pages.
Bishop. "Mixture density networks," Tech. Rep. Feb. 1994, 26 pages.
Black et al. "Automatically clustering similar units for unit selection in speech synthesis," Proceedings of Eurospeech, Sep. 1997, 4 pages.
Chorowski et al. "Attention-based models for speech recognition," NIPS Dec. 2015, 9 pages.
Davis et al. "Comparison of parametric representations for monosyllabic word recognition in continuously spoken sentences," Reading in speech recognition, 1990, 25 pages.
Gonzalvo et al. "Recent advances in Google real-time HMM-driven unit selection synthesizer," Interspeech, Sep. 2016, 5 pages.
Griffin et al. "Signal estimation from modified short-time Fourier transform," IEEE Transaction on Acoustics Speech and Signal Processing 32(2), Apr. 1984, 8 pages.
Hochreiter et al. "Long Short-term memory," Neural Computation, vol. 9(8), Nov. 1997, 32 pages.
Hunt et al. "Unit selection in a concatenative speech synthesis system using a large speech database," Proceedings of ICASSP, May 1996, 4 pages.
Ioffe et al. "Batch normalization: Accelerating deep network training by reducing internal covariate shift," arXiv 1502.03167, Mar. 2015, 11 pages.
Kingma et al. "Adam: A method for stochastic optimization," arXiv 1412.6980, 15 pages.
Kruger et al. "Zoneout: Regularizing RNNs by randomly preserving hidden activations," arXiv 1606.01305, Sep. 2017, 11 pages.
Ping et al. "Deep Voice 3: 2000-speaker neural text-to-speech," arXiv 1710.07654, Oct. 2017, 16 pages.
Piqueras, "Autoregressive model based on a deep convolutional neural network for audio generation. MS thesis" 2017.
Salimans et al. "PixelCNN++: Improving the PixelCNN with discretized logistic picture likelihood and other modifications," arXiv 1701.05517, Jan. 19, 2017, 10 pages.
Schuster et al. "Bidirectional recurrent neural networks," IEEE Transactions on Signal Processing 45(11), Nov. 1997, 9 pages.
Schuster. "On Supervised Learning from sequential data with applications for speech recognition," Ph.D Thesis, Nara Institute of Science and Technology, Feb. 1999, 146 pages.
Shen et al. "Natural tts synthesis by conditioning wavenet on mel spectrogram predictions." 2018 IEEE International Conference on Acoustics, Speech and Signal Processing (ICASSP). arXiv, 2018.
Sotelo et al. "Char2Wav: End to end speech synthesis," Proceedings of ICLR, Apr. 2017, 6 pages.
Srivastava et al. "Dropout: a simple way to prevent neural networks from overfitting," Journal of Machine Learning Research, vol. 15 (1) Jun. 2014, 30 pages.
Sutskever et al. "Sequence to sequence learning with neural networks," NIPS Dec. 2014, 9 pages.
Tamamori et al. "Speaker-dependent WaveNet vocoder," Proceedings of Interspeech, Aug. 2017, 5 pages.
Taylor. "Chapter One: Text-to-Speech Synthesis," Cambridge University Press, 1st edition, 2009, [retrieved on Aug. 21, 2018] Retrieved from Internet: URL<http://kitabxana.net/files/books/file/1350491502.pdf> 31 pages.
Tjandra, Andros, Sakriani Sakti, and Satoshi Nakamura. "Listening while speaking: Speech chain by deep learning." 2017 IEEE Automatic Speech Recognition and Understanding Workshop (ASRU). IEEE, 2017.
Tokuda et al. "Speech parameter generation algorithms for HMM-based speech synthesis," Proceedings of ICASSP, Jun. 2000, 4 pages.
Tokuda et al. "Speech synthesis based on hidden Markov models," Proceedings of the IEEE, vol. 101, No. 5, May 2013, 18 pages.
Van den Oord et al. "Parallel WaveNet: Fast High-Fidelity Speech Synthesis," arXiv 1711.10433, Nov. 28, 2017, 11 pages.
Van den Oord et al. "WaveNet: A generative model for raw audio," SSW Sep. 2016, 15 pages.
Wang et al. "Tacotron: A fully end-to-end text-to-speech synthesis model." arXiv preprint arXiv:1703.10135 (2017).
Wang et al. "Tacotron: Towards end-to-end speech synthesis," arXiv 1703.10135, Apr. 6, 2017, 10 pages.
Zen et al. "Fast, compact, and high quality LSTM-RNN based statistical parametric speech synthesizers for mobile devices," arXiv 1606.06061 Jun. 22, 2016, 14 pages.
Zen et al. "Statistical parametric speech synthesis using deep neural networks," Proceedings of ICASSP, May 2013, 5 pages.

* cited by examiner

SYNTHESIZING SPEECH FROM TEXT USING NEURAL NETWORKS

CROSS-REFERENCE TO RELATED APPLICATIONS

This application is a continuation application of, and claims priority to, U.S. patent application Ser. No. 16/058,640, U.S. Pat. No. 10,971,170, titled "SYNTHESIZING SPEECH FROM TEXT USING NEURAL NETWORKS," filed on Aug. 8, 2018. The disclosure of the foregoing application is incorporated herein by reference in its entirety for all purposes.

BACKGROUND

This specification relates generally to processing input text using neural networks to generate speech.

Neural networks are machine learning models that employ multiple layers of operations to predict one or more outputs from one or more inputs. Neural networks typically include one or more hidden layers situated between an input layer and an output layer. The output of each hidden layer is used as input to a next layer, e.g., the next hidden layer or the output layer.

Each layer of a neural network specifies one or more transformation operations to be performed on input to the layer. Some neural network layers contain units that are referred to as neurons. Each neuron receives one or more inputs and generates an output that is received by other neural network layers. Often, each neuron receives inputs from other neurons, and each neuron provides an output to one or more other neurons.

Each layer generates one or more outputs using the current values of a set of parameters for the layer. Training a neural network involves continually performing a forward pass on the input, computing gradient values, and updating the current values of the set of parameters for each layer. Once a neural network is trained, the final set of parameters can be used to make predictions in a production system.

SUMMARY

This specification describes a method for generating an output sequence of audio data representing an input character sequence by processing that input character sequence using neural networks. The output sequence of audio data includes a respective audio output sample for each of a number of time steps. The method includes, for each of the time steps: generating a mel-frequency spectrogram for the time step by processing a representation of a respective portion of the input character sequence using a decoder neural network; generating a probability distribution over a plurality of possible audio output samples for the time step by processing the mel-frequency spectrogram for the time step using a vocoder neural network; and selecting the audio output sample for the time step from the plurality of possible audio output samples in accordance with the probability distribution.

The subject matter of this specification can be implemented so as to realize one or more of the following advantages. Existing neural network-based text-to-speech systems generate high-quality speech but receive inputs that require significant domain expertise to produce. For example, existing text-to-speech systems receive complex linguistic and acoustic features, i.e., qualities or characteristics of speech that together define phonemes. Existing text-to-speech systems also require a robust lexicon, i.e., a pronunciation guide. The system described in this specification simplifies the traditional speech synthesis pipeline by replacing linguistic and acoustic features with a single neural network trained on sample input texts and corresponding mel-frequency spectrograms of human speech alone. The system can convert input character sequences to mel-frequency spectrograms using an end-to-end neural network. A separately-trained vocoder network, i.e., a network that synthesizes human speech, can then convert the mel-frequency spectrograms into time-domain audio waveforms. Such a system can generate speech that approaches the fidelity of real human speech without using linguistic features that are difficult to produce. Additionally, eliminating the generation of linguistic features allows the claimed system to generate high fidelity speech using fewer computational resources than existing systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
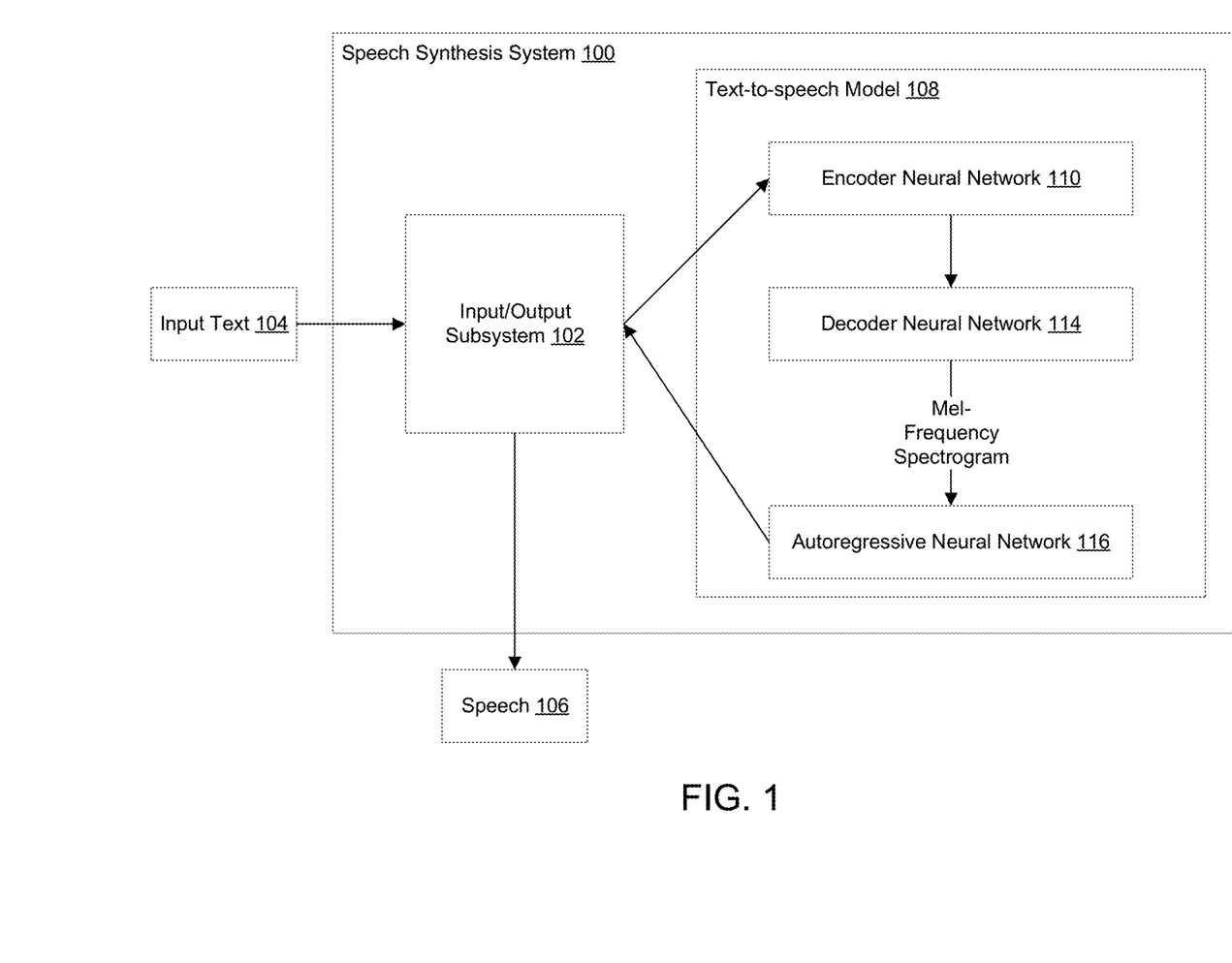
FIG. 1 depicts an example speech synthesis system.

FIG. 1 shows an example speech synthesis system 100. The speech synthesis system 100 can be implemented as a computer program on one or more computers in one or more locations.

The speech synthesis system 100 receives input text and processes that input text through a series of neural networks to generate speech that is a verbalization or a narration of the input text.

For example, if the speech synthesis system 100 receives as input the text of a page of a book, it can process that text to generate a verbal narration of the page.

The speech synthesis system 100 includes an input/output subsystem 102 configured to receive input text 104 as input and to provide speech 106 as output. The input text 104 includes a sequence of characters in a particular natural language, e.g., English, Spanish, or French. The sequence of characters can include letters, numbers, punctuation marks, and/or other special characters. The speech 106 that the speech synthesis system 100 generates approximates human speech, i.e., how a human would verbalize the sequence of characters that make up the input text 104.

The input/output subsystem 102 can include an optical character recognition (OCR) unit to convert images of typed, handwritten, or printed text into machine-encoded text. The input/output subsystem 102 can also include an audio output device to convert time-domain audio waveforms into audio.

The input/output subsystem 102 is also configured to convert each character in the sequence of characters in the input text 104 into a one-hot vector and embed each one-hot vector in a continuous vector. That is, the input/output subsystem 102 can represent each character in the sequence as a one-hot vector and then generate an embedding, i.e., a vector or other ordered collection of numeric values, of the character.

The speech synthesis system 100 includes a text-to-speech model 108 ("TTS model 108"). The TTS model 108 is configured to receive character embeddings from the input/output subsystem 102 and process those character embeddings to generate time-domain audio waveforms. A time-domain audio waveform is an audio waveform that defines an audio signal's amplitude over time.

In particular, an encoder neural network 110 of the TTS model 108 is configured to receive the character embeddings from the input/output subsystem 102 and generate a fixed-length context vector for each mel-frequency spectrogram that a decoder neural network 114 will later generate. The fixed-length context vectors define features that appear in particular positions in the sequence of characters. The features model the context in which each character in the sequence of characters appears.

In some implementations, the encoder neural network 110 can include one or more convolutional layers followed by a bi-directional long short-term memory ("LSTM") layer. The neurons in each convolutional layer can receive input from only a small subset of neurons in a previous layer. This neuron connectivity allows the convolutional layers to learn filters that activate when particular hidden features appear in particular positions in a sequence of characters. In some implementations, each filter in each convolutional layer spans four, five, or six characters. Each convolutional layer can be followed by batch normalization and rectified linear units ("ReLUs"). In implementations of the encoder neural network 110 that include one or more convolutional layers, a bi-directional LSTM layer can follow those convolutional layers. The bi-directional LSTM layer can be configured to process the hidden features generated by the final convolutional layer to generate a sequential feature representation of the sequence of characters. A sequential feature representation represents a local structure of the sequence of characters around a particular character. A sequential feature representation may include a sequence of feature vectors.

The encoder neural network 110 can also include an attention network. The attention network can be configured to receive a sequential feature representation from another component of the encoder neural network 110, e.g., a bi-directional LSTM layer, and process the sequential feature representation to generate a fixed-length context vector for each decoder output step. That is, the attention network can generate a fixed-length context vector for each frame of a mel-frequency spectrogram that a decoder neural network 114 will later generate. A frame is a unit of the mel-frequency spectrogram that is based on a small portion of the input signal, e.g., a 10 millisecond sample of the input signal.

The decoder neural network 114 is configured to receive as input the fixed-length context vectors and generate, for each fixed-length context vector, a corresponding frame of a mel-frequency spectrogram. A mel-frequency spectrogram is a frequency-domain representation of sound. Mel-frequency spectrograms emphasize lower frequencies, which are critical to speech intelligibility, while de-emphasizing high frequency, which are dominated by fricatives and other noise bursts and generally do not need to be modeled with high fidelity. In some implementations, the mel-frequency spectrograms that the decoder neural network generates have a frame length of 12.5 milliseconds. The architecture of the decoder neural network 114 will be described in more detail in reference to FIG. 2.

Finally, the TTS model 108 includes a vocoder network 116. The vocoder network 116 can be any network that is configured to receive mel-frequency spectrograms and generate audio output samples based on the mel-frequency spectrograms. For example, the vocoder network 116 can be, or can be based on, the parallel feed-forward neural network described in van den Oord, *Parallel WaveNet: Fast High-Fidelity Speech Synthesis*, available at https://arxiv.org/pdf/1711.10433.pdf, and incorporated herein by reference. Alternatively, the vocoder network 116 can be an autoregressive neural network.

In implementations in which the vocoder network 116 is an autoregressive neural network, it receives the mel-frequency spectrograms from the decoder neural network 114 and operates in an auto-regressive manner over multiple time steps. At a given time step, the vocoder network 116 generates a probability distribution over a plurality of possible audio output samples for the time step conditioned on the following: (i) a current output sequence of audio data, including respective audio output samples for each preceding time step in the output sequence of audio data, and (ii) the mel-frequency spectrogram for the time step. Then, the input/output subsystem 102 can select the audio sample for the current step using the probability distribution for the time step. One example architecture of the vocoder network 116 will be described in more detail in reference to FIG. 3.

The encoder neural network 110 and decoder neural network 114 are trained together using a maximum likelihood training procedure. That is, during training, the decoder neural network 114 receives as input a correct output from the previous time step. This is known as teacher-forcing. The training data includes sample input texts with known mel-frequency spectrograms. The vocoder network 116 is trained separately.

The input/output subsystem 102 can sample or select the audio output sample for the time step from the probability distribution. Thereafter, the input/output subsystem 102 can play the audio output sample with an audio output device, e.g., a speaker.

In summary, the speech synthesis system 100 can generate speech from text using neural networks trained on sample input texts and corresponding mel-frequency spectrograms of human speech alone. That is, the system 100 does not receive complex linguistic and acoustic features that require significant domain expertise to produce. Instead, the system can convert input character sequences to mel-frequency spectrograms using an end-to-end neural network. A separately-trained autoregressive neural network that is conditioned on mel-frequency spectrograms can then generate time-domain audio waveforms.

Figure 2:
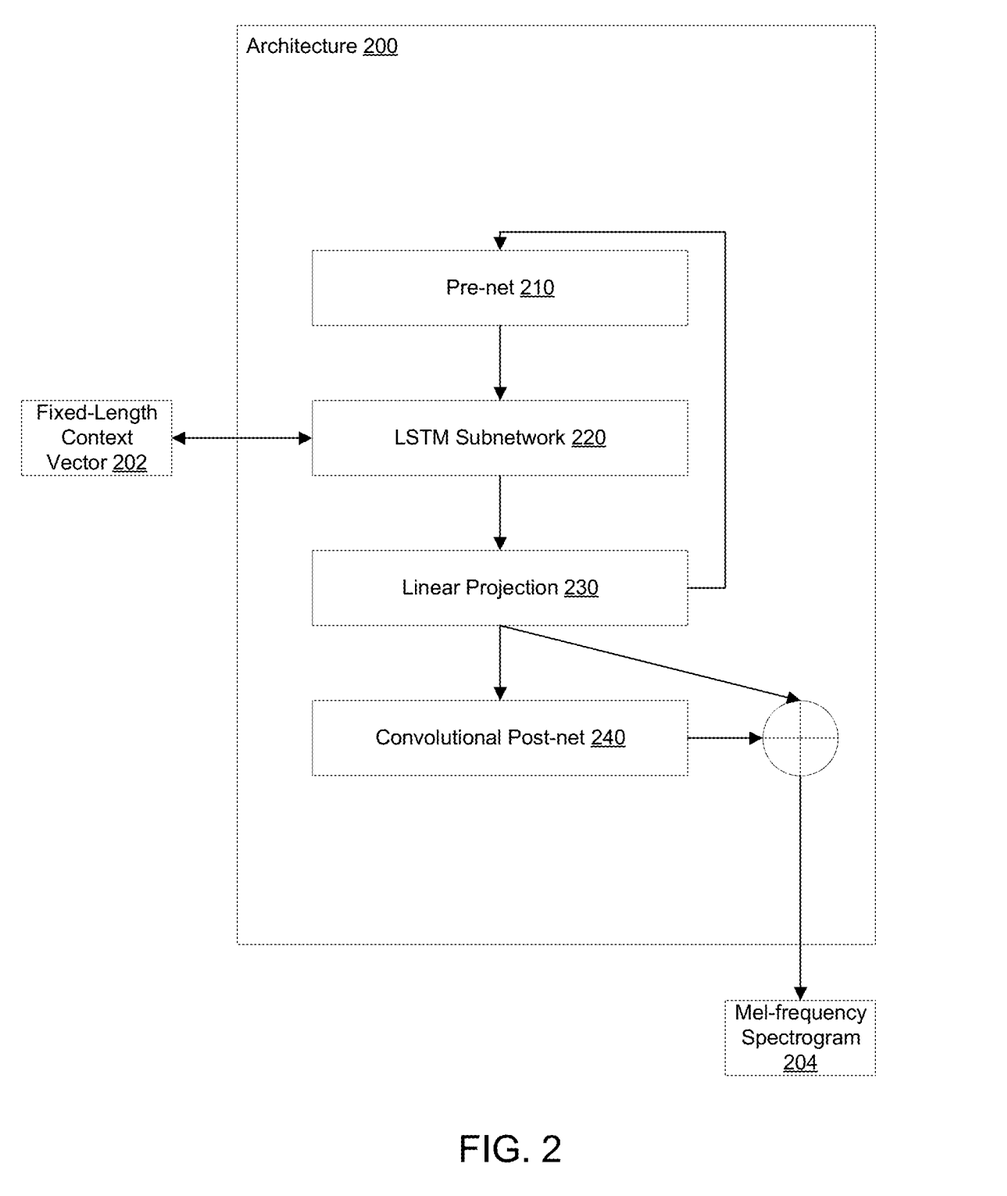
FIG. 2 depicts an example architecture for a decoder neural network.

FIG. 2 depicts an example architecture 200 for the decoder neural network 114 of FIG. 1.

In the architecture 200, the decoder neural network 114 includes a pre-net 210 through which a mel-frequency spectrogram prediction for a previous time step passes. The pre-net 210 includes two fully-connected layers of hidden ReLUs. The pre-net 210 acts as an information bottleneck for learning attention to increase convergence speed and to improve generalization capability of the speech synthesis system during training. In order to introduce output variation at inference time, dropout with probability 0.5 is applied to layers in the pre-net.

The architecture 200 also includes an LSTM subnetwork 220 with two LSTM layers. At each time step, the LSTM subnetwork 220 receives a concatenation of the output of the pre-net 210 and a fixed-length context vector 202 for the time step. The LSTM layers are regularized using zoneout with probability 0.1.

A linear transform 230 receives as input the output of the LSTM subnetwork 220 and produces a prediction of the mel-frequency spectrogram.

Finally, a convolutional post-net 240 with one or more convolutional layers processes the predicted mel-frequency spectrogram for the time step to predict a residual to add to the predicted mel-frequency spectrogram. This improves the overall reconstruction. Each convolutional layer except for the final convolutional layer is followed by batch normalization and tanh activations. The convolutional layers are regularized using dropout with probability 0.5. The residual is added to the predicted mel-frequency spectrogram generated by the linear projection 230, and the sum is provided to the vocoder network 116 of FIG. 1.

In parallel to the decoder neural network 114 predicting mel-frequency spectrograms for each time step, a concatenation of the output of the LSTM subnetwork 220 and the fixed-length context vector 202 is projected to a scalar and passed through a sigmoid activation to predict the probability that the output sequence of mel frequency spectrograms has completed. This "stop token" prediction is used during inference to allow the model to dynamically determine when to terminate generation instead of always generating for a fixed duration. When the stop token says that generation has terminated, i.e., when the stop token probability exceeds a threshold value, the decoder neural network 114 stops predicting mel-frequency spectrograms and returns the mel-frequency spectrograms predicted up to that point. Alternatively, the decoder neural network can always generate mel-frequency spectrograms of the same length, e.g., 10 seconds.

Figure 3:
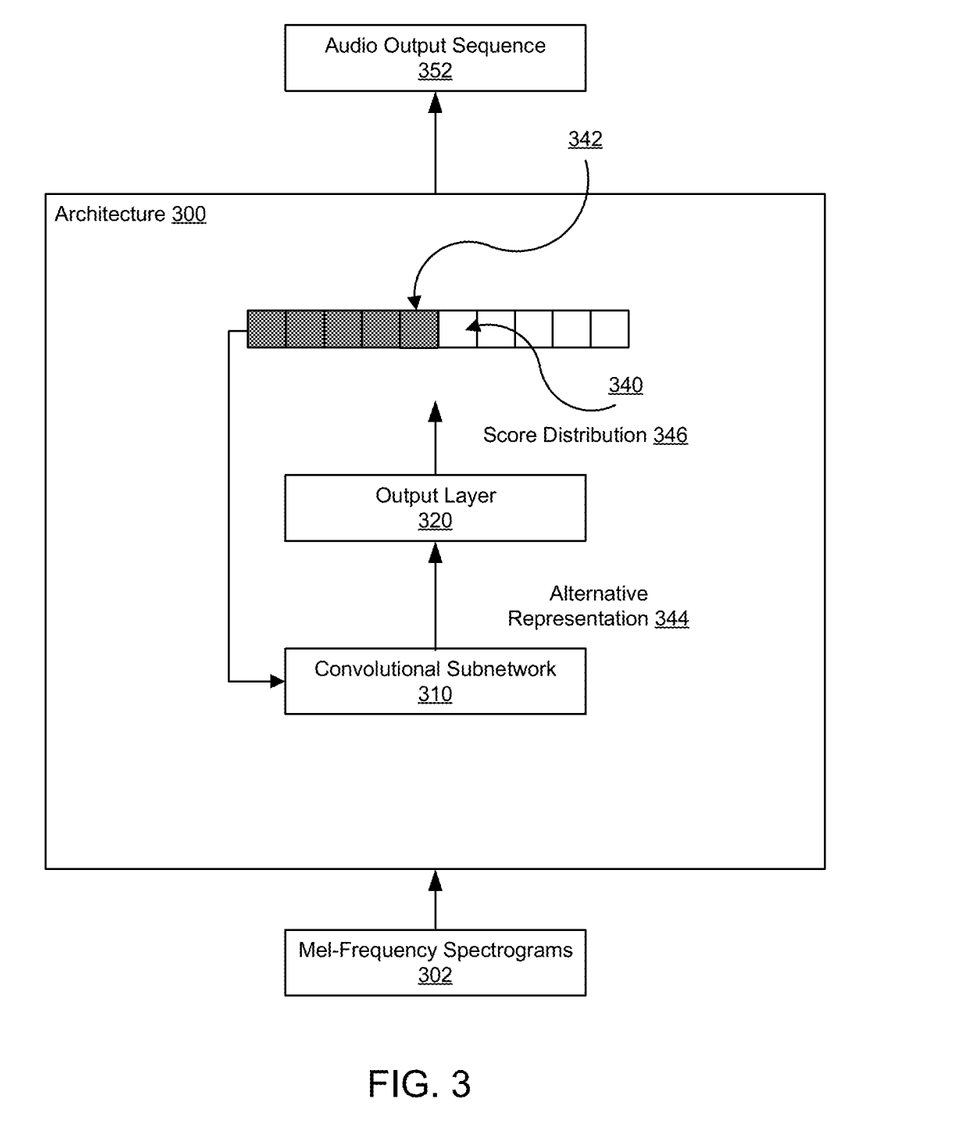
FIG. 3 depicts an example architecture for an autoregressive neural network.

FIG. 3 depicts an example architecture 300 for the vocoder network 116 of FIG. 1. The architecture 300 is an autoregressive, convolutional neural network.

The architecture 300 generates sequences of audio data that each include a respective audio output sample at each of multiple time steps.

Generally, each time step in a given audio output sequence corresponds to a respective time in an audio waveform. The audio output sample at the time step characterizes the waveform at the corresponding time. In some implementations, the audio output sample at each time step in the audio output sequence is the amplitude of the audio waveform at the corresponding time, i.e., the audio output sequence generated by the architecture 300 is a raw audio waveform. In some other implementations, the audio output sample at each time step in the sequence is a compressed or companded representation of the waveform at the corresponding time. For example, the audio output sample can be a μ-law transformed representation of the waveform.

The architecture 300 receives as input, at each of multiple time steps, a mel-frequency spectrogram and generates an audio output sample at each of the multiple time steps by conditioning the architecture 300 on both the mel-frequency spectrogram and a current audio output sequence, including respective audio output samples for each preceding time step. Together, the audio output samples form an audio output sequence 352.

Specifically, at each time step during the generation of an audio output sequence, a convolutional subnetwork 310 receives a current audio output sequence 342 that includes audio output samples that the architecture 300 has already generated as of the time step. The convolutional subnetwork 310 processes the current audio output sequence 342, conditioned on a mel-frequency spectrogram 302 for the time step, to generate an alternative representation 344 for the time step. The alternative representation 344 can be a numeric representation, i.e., an ordered collection of numeric values, in which the current audio output sequence 342 has been encoded by the convolutional subnetwork, for example by encoding features of the current audio output sequence 342.

The output layer 320 is configured to, at each of the time steps, receive the alternative representation 344 at the time step and generate a probability distribution over possible audio output samples for the time step.

In some implementations, the output layer 320 is a logistic output layer that generates parameters, e.g., mean, log scale, or mixture weight, of a logistic mixture distribution over possible audio output samples for the time step. The logistic output layer includes ReLUs followed by a linear projection.

In other implementations, the output layer 320 is a softmax output layer that generates a discrete probability distribution over possible audio samples for the time step. That is, each possible audio sample is associated with a discrete score.

Once the output layer 320 has generated the score distribution for a given time step, the input/output subsystem of FIG. 1, or some other external subsystem, can select an audio output sample to be included in the audio output sequence 352 in accordance with the score distribution for the given time step.

The convolutional subnetwork 310 generally includes multiple audio-processing convolutional neural network layers. More specifically, the audio-processing convolutional neural network layers include multiple causal convolutional layers.

A causal convolutional layer is a convolutional layer that operates on an input sequence that has a respective input at each of multiple time steps by, for each time step, generating an output that depends only on the inputs at the time step and at the time steps before the time step in the input sequence, i.e., and not on any inputs at any time steps after the time step in the input sequence. In some cases, the causal convolutional layers are implemented by applying a normal convolution and then shifting each output of the normal convolution by a few time steps, i.e., shifting each output forward by (filter length—1) time steps, prior to applying the activation function for the convolutional layer, where "filter length" is the length of the filter of the convolution that is being applied.

To increase the receptive field of the audio-processing convolutional layers without requiring an excessive number of layers or filters of excessive length, some or all of the audio-processing convolutional layers can be dilated causal convolutional layers. A dilated convolution is a convolution where the filter is applied over an area larger than its length by skipping input values with a certain step that is defined by the dilation value for the dilated convolution. By incorporating dilated causal convolutions, the audio processing neural network layers effectively operate on their inputs with a coarser scale than with a normal convolution.

In some implementations, the audio-processing neural network layers include a stack of multiple blocks of dilated causal convolutional layers. Each block in the stack can include multiple dilated convolutional neural network layers with increasing dilation. For example, within a block, the dilation can double for each layer starting from an initial dilation, and then return to the initial dilation for the first layer in the next block. As an illustrative example, the dilations of the dilated convolutional layers in a block can be, in order: 1, 2, 4, . . . , 512.

In some implementations, the convolutional subnetwork includes residual connections, skip connections, or both.

As mentioned above, the architecture 300 generates an audio output sample for a particular time step conditioned on the mel-frequency spectrogram for that time step. Generally, the audio output samples are conditioned on the mel-frequency spectrograms by conditioning the activation function of some or all of the convolutional layers in the convolutional subnetwork. That is, the output of the activation function and, accordingly, the output of the convolutional layer, is dependent not only on the output of the convolution performed by the layer but also on the mel-frequency spectrogram.

Conditioning an activation function of a convolutional layer on the neural network input will be described in more detail below with reference to FIG. 4.

The architecture 300 can be trained on raw or compressed and/or companded audio data, for example waveforms of human speakers, music and so forth. The training data for the architecture 300 also includes the ground-truth aligned mel-spectrogram predictions made by the decoder neural network 116. That is, the decoder neural network 166 produces mel-frequency spectrogram predictions in teacher-forcing mode so that each predicted mel-frequency spectrogram exactly aligns with the target waveform samples.

Generally, the system can perform the training to determine the trained values of the parameters using conventional supervised learning techniques, e.g., a stochastic gradient descent with backpropagation based technique. As described above, because of this parallelization and the use of causal convolutional layers, the system does not need as many computational resources to train as other systems, e.g., those that include recurrent neural network layers, resulting in a reduced training time.

Figure 4:
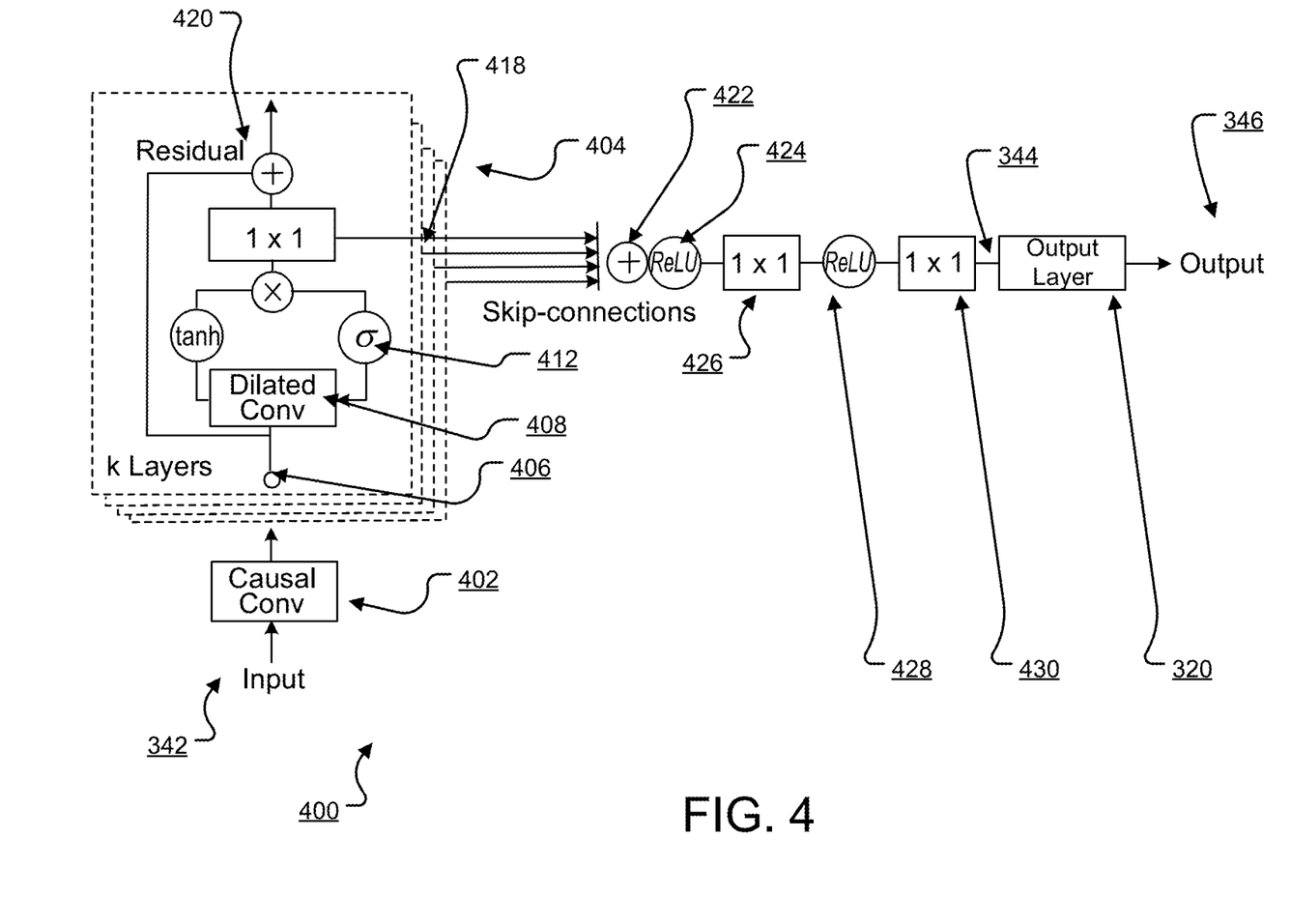
FIG. 4 depicts an example architecture for a convolutional subnetwork

FIG. 4 shows an example architecture 400 for the convolutional subnetwork 310 of FIG. 3. As described above, in the example architecture 400, the dilated causal convolutional layers that are in the convolutional subnetwork have residual connections and skip connections.

In particular, in the architecture 400, the convolutional subnetwork 310 includes a causal convolutional layer 402 that processes the current audio output sequence 342, i.e., by applying a causal convolution to the current audio output sequence 342.

The convolutional subnetwork 310 then processes the output of the causal convolutional layer 402 through a stack of dilated causal convolutional layers.

Each dilated causal convolutional layer 404 in the stack applies a dilated causal convolution 408 to the input 406 to the dilated causal convolutional layer 404. As described above, in some implementations, the dilated causal convolutional layers in the stack are arranged in blocks, with the dilation of the dilated causal convolutions applied by each layer increasing within a given block and then restarting at the initial value for the first layer in the next block.

In some implementations, the dilated causal convolutional layers in the stack have a gated activation function in which the output of an element-wise non-linearity, i.e., of a conventional activation function, is element-wise multiplied by a gate vector. In some of these implementations, the dilated causal convolution 408 includes two dilated causal convolutions on the layer input 402—a first dilated causal convolution between a main filter for the layer 404 and the layer input 406 and another dilated causal convolution between a gate filter for the layer 404 and the layer input 406. In some of these implementations, dilated causal convolution 408 is a single dilated causal convolution and half of the output of the single convolution is provided as the output of the dilated causal convolution between the main filter for the layer 404 and the layer input 406 and the other half of the output of the single convolution is provided as the output of the dilated causal convolution between the gate filter for the layer 404 and the layer input 406.

The dilated causal convolutional layer 404 then determines the output of the activation function of the layer 404 using the outputs of the dilated causal convolution. As mentioned above, because the output sequence being generated is conditioned on a neural network input, i.e., a sequence of mel-frequency spectrograms, the layer 404 also conditions the output of the activation function on that neural network input. In particular, the non-linear function and the gating function each take as input a combination of the corresponding dilated convolution output and an input generated from the neural network input.

If the sequence of mel-spectrograms is represented by y, then the output of the activation function z for the layer k satisfies:

$$z = \tan h(W_{f,k}*x + V_{f,k}*y) \odot \sigma(W_{g,k}*x + V_{g,k}*y),$$

where $W_{f,k}$ is the main filter for the layer k, x is the layer input, * denotes a causal dilated convolution, $\odot$ denotes element-wise multiplication, $W_{g,k}$ is the gate filter for the layer k, and $V_{f,k}*y$ and $V_{g,k}*y$ are respective 1×1 convolutions.

Because the architecture 400 includes skip connections and residual connections for the dilated causal convolutional layers, the layer 404 then performs a 1×1 convolution 416 on the activation function output.

The layer 404 provides the output of the 1×1 convolution as the skip output 418 of the layer and adds the residual, i.e., the layer input 406, and the output of the 1×1 convolution to generate the final output 420 of the layer 404. The convolutional subnetwork 310 then provides the final output 420 as the layer input to the next dilated convolutional layer in the stack.

In some implementations, the layer 404 performs two 1×1 convolutions on the activation function output, one with a residual filter and the other with a skip filter. In these implementations, the layer 404 provides the output of the convolution with the skip filter as the skip output 418 of the layer and adds the residual and the output of the 1×1 convolution with the residual filter to generate the final output 420 of the layer 404.

The convolutional subnetwork 310 then provides the final output 420 as the layer input to the next dilated convolutional layer in the stack. For the last layer in the stack, because there is no next layer, the convolutional subnetwork 310 can either discard the final output 420 generated by the last layer or can refrain from computing a final output, i.e., can refrain from performing the 1×1 convolution and the residual sum for the last layer in the stack.

Once the processing of all of the layers 404 in the stack of dilated convolutional layers has been completed, the convolutional subnetwork 310 sums 422 the skip outputs generated by the layers 404. The convolutional subnetwork 310 can then apply one or more non-linear functions, one or more 1×1 convolutions, or both to the sum 422 to generate the alternative representation 144. In particular, in the example of FIG. 4, the convolutional subnetwork 310 applies an element-wise non-linearity 424, e.g., a ReLU, followed by a 1×1 convolution 426, followed by another element-wise non-linearity 428, and followed by a final 1×1 convolution 430, to generate the alternative representation 344.

As described above, the output layer 320 then processes the alternative representation 344 to generate the score distribution 346.

Figure 5:
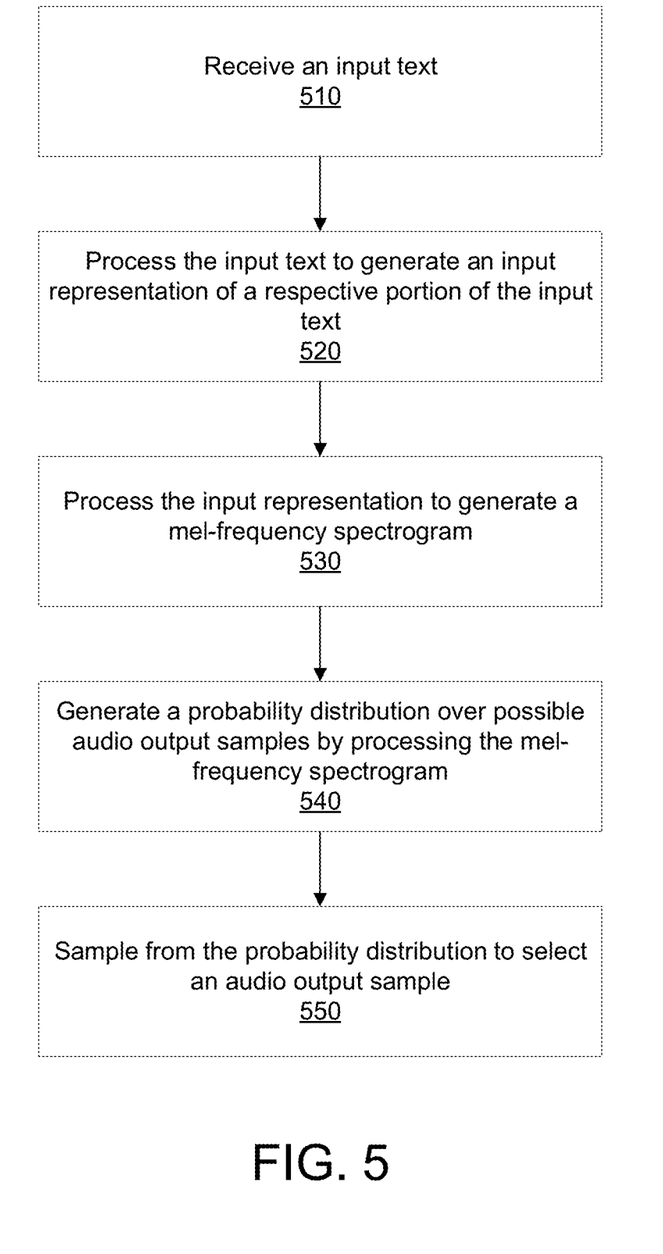
FIG. 5 is a flow chart of an example process for generating speech based on an input text.

FIG. 5 is a flow chart of an example process for generating speech based on an input text. For convenience, the process 500 will be described as being performed by a system of one or more computers located in one or more locations. For example, a text-to-speech system, e.g. the speech synthesis system 100 of FIG. 1, appropriately programmed, can perform the process 500.

The system receives an input text made up of a sequence of characters (510). The sequence of characters can include letters, numbers, punctuation marks, and/or other special characters.

The system processes the sequence of characters in the input text to generate an input representation of a respective portion of the sequence of characters for each of a plurality of time steps (520). The input representation can be a fixed-length context vector for the time step. Such a fixed-length context vector can be generated by processing the input character sequence using an encoder neural network, e.g., the encoder neural network 110 of FIG. 1.

The system then processes the input representation for each time step to generate a mel-frequency spectrogram for each time step (530). In particular, an autoregressive recurrent neural network, e.g., the decoder neural network 114 of FIG. 1, can process the input representation to generate these mel-frequency spectrograms.

The system generates a probability distribution over a plurality of possible audio output samples for the time step by processing the mel-frequency spectrogram for the time step using a vocoder neural network (540). The vocoder neural network can be an autoregressive neural network that is conditioned on a current output sequence of audio data, including respective audio output samples for each preceding time step in the output sequence Finally, the system selects the audio sample for the time step from the plurality of possible audio samples in accordance with the probability distribution (550). Selecting one of the possible audio samples in accordance with the probability distribution for the time step can involve sampling from the probability distribution.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for generating, from an input character sequence, an output sequence of audio data representing the input character sequence, wherein the output sequence of audio data comprises a respective audio output sample for each of a plurality of time steps, and wherein the method comprises, for each of the plurality of time steps:

generating a mel-frequency spectrogram for the time step by processing a representation of a respective portion of the input character sequence using a decoder neural network;

generating a probability distribution over a plurality of possible audio output samples for the time step by processing the mel-frequency spectrogram for the time step using a vocoder neural network; and selecting the audio output sample for the time step from the plurality of possible audio output samples in accordance with the probability distribution.

Embodiment 2 is the method of embodiment 1, wherein the vocoder neural network is an autoregressive neural network, and wherein generating the probability distribution further comprises:

conditioning the autoregressive neural network on a current output sequence of audio data comprising respective audio output samples for each preceding time step in the output sequence.

Embodiment 3 is the method of any of embodiments 1-2, wherein generating the representation of the portion of the input character sequence comprises:

processing, by an encoder neural network, the input character sequence to generate a feature representation of the input character sequence; and processing, by an attention network, the feature representation, to generate a fixed-length context vector for the time step.

Embodiment 4 is the method of embodiment 3, wherein the encoder neural network comprises a convolutional subnetwork and a bidirectional long short-term memory (LSTM) layer, and wherein the feature representation is a sequential feature representation that represents a local structure of the input character sequence around a particular character in the input character sequence.

Embodiment 5 is the method of any of embodiments 1-4, wherein the decoder neural network is an autoregressive neural network comprising an LSTM subnetwork, a linear transform, and a convolutional subnetwork.

Embodiment 6 is the method of embodiment 2, wherein the autoregressive neural network comprises:

a convolutional subnetwork having one or more dilated convolutional layers; and a logistic output layer configured to generate a continuous probability distribution of possible audio output samples.

Embodiment 7 is the method of any of embodiments 1-6, wherein the probability distribution is a logistic distribution.

Embodiment 8 is the method of any of embodiments 1-7, wherein selecting one of the possible audio samples in accordance with the probability distribution for the time step comprises sampling from the probability distribution.

Embodiment 9 is the method of any of embodiments 1-8, wherein each of the plurality of time steps corresponds to a respective time in an audio waveform, and wherein the respective audio sample at each of the plurality of time steps is an amplitude value of the audio waveform at the corresponding time step.

Embodiment 10 is the method of any of embodiments 1-9, wherein a frame length of each mel-frequency spectrogram is 12.5 milliseconds.

Embodiment 11 is a system comprising: one or more computers and one or more storage devices storing instructions that are operable, when executed by the one or more computers, to cause the one or more computers to perform operations to perform the method of any one of embodiments 1-10.

Embodiment 12 is one or more computer storage media storing instructions that are operable, when executed by the one or more computers, to cause the one or more computers to perform the method of any one of embodiments 1-10.

While this specification contains many specific implementation details, these should not be construed as limitations on the scope of any invention or on the scope of what is being or may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed:

1. A method for generating, from an input data representing a text input, an output sequence of audio data corresponding to the input data, wherein the output sequence of audio data comprises a respective audio output sample for each of a plurality of time steps, and wherein the method comprises, for each of the plurality of time steps:
generating a mel-frequency spectrogram for a timestep of the plurality of timesteps by processing a representation of a respective portion of the input data using a decoder neural network, wherein the decoder neural network is an autoregressive neural network comprising an LSTM subnetwork, a linear transform, and a convolutional subnetwork;
generating a probability distribution over a plurality of possible audio output samples for the time step by processing the mel-frequency spectrogram for the time step using a vocoder neural network; and
selecting an audio output sample for the time step from the plurality of possible audio output samples in accordance with the probability distribution.

2. The method of claim 1, wherein the vocoder neural network is an autoregressive neural network, and wherein generating the probability distribution further comprises:
conditioning the autoregressive neural network on a current output sequence of audio data comprising respective audio output samples for each preceding time step in the output sequence.

3. The method of claim 1, wherein processing the representation of the respective portion of the input data, comprises:
processing, by an encoder neural network, the input data to generate a feature representation of the input data; and
processing, by an attention network, the feature representation, to generate a fixed-length context vector for the time step.

4. The method of claim 3, wherein the encoder neural network comprises a convolutional subnetwork and a bidirectional long short-term memory (LSTM) layer, and wherein the feature representation is a sequential feature representation that represents a local structure of the input data around a particular character in the input data.

5. The method of claim 2, wherein the autoregressive neural network of the vocoder neural network, comprises:
a convolutional subnetwork having one or more dilated convolutional layers; and
a logistic output layer configured to generate a continuous probability distribution of possible audio output samples.

6. The method of claim 1, wherein the probability distribution is a logistic distribution.

7. The method of claim 1, wherein selecting one of the plurality of possible audio samples in accordance with the probability distribution for the time step comprises sampling from the probability distribution.

8. The method of claim 1, wherein:
each of the plurality of time steps corresponds to a respective time in an audio waveform, and wherein the respective audio sample at each of the plurality of time steps is an amplitude value of the audio waveform at the corresponding time step; and
a frame length of each mel-frequency spectrogram is 12.5 milliseconds.

9. A system comprising one or more computers and one or more storage devices storing instructions that are operable, when executed by the one or more computers, to cause the one or more computers to perform operations comprising:
generating, from an input data representing a text input, an output sequence of audio data representing the input data, wherein the output sequence of audio data comprises a respective audio output sample for each of a plurality of time steps, including, for each of the plurality of time steps:
generating a mel-frequency spectrogram for a timestep of the plurality of timesteps by processing a representation of a respective portion of the input data using a decoder neural network, wherein the decoder neural network is an autoregressive neural network comprising an LSTM subnetwork, a linear transform, and a convolutional subnetwork;
generating a probability distribution over a plurality of possible audio output samples for the time step by processing the mel-frequency spectrogram for the time step using a vocoder neural network; and selecting an audio output sample for the time step from the plurality of possible audio output samples in accordance with the probability distribution.

10. The system of claim 9, wherein the vocoder neural network is an autoregressive neural network, and wherein generating the probability distribution further comprises:

conditioning the autoregressive neural network on a current output sequence of audio data comprising respective audio output samples for each preceding time step in the output sequence.

11. The system of claim 9, wherein processing the representation of the respective portion of the input data using the decoder neural network, comprises:

processing, by an encoder neural network, the input data to generate a feature representation of a character sequence in the input data; and processing, by an attention network, the feature representation, to generate a fixed-length context vector for the time step.

12. The system of claim 11, wherein the encoder neural network comprises a convolutional subnetwork and a bidirectional long short-term memory (LSTM) layer, and wherein the feature representation is a sequential feature representation that represents a local structure of the input data around a particular character in an input character sequence included in the input data.

13. The system of claim 9, wherein the autoregressive neural network of the vocoder neural network comprises:

a convolutional subnetwork having one or more dilated convolutional layers; and a logistic output layer configured to generate a continuous probability distribution of possible audio output samples.

14. The system of claim 9, wherein the probability distribution is a logistic distribution and wherein selecting one of the plurality of possible audio samples in accordance with the probability distribution for the time step comprises sampling from the probability distribution.

15. The system of claim 11, wherein each of the plurality of time steps corresponds to a respective time in an audio waveform, and wherein the respective audio sample at each of the plurality of time steps is an amplitude value of the audio waveform at the corresponding time step and wherein a frame length of each mel-frequency spectrogram is 12.5 milliseconds.

16. A method for generating, from an input data representing a text input, an output sequence of audio data corresponding to the input data, wherein the output sequence of audio data comprises a respective audio output sample for each of a plurality of time steps, and wherein the method comprises, for each of the plurality of time steps:

generating a mel-frequency spectrogram for a timestep of the plurality of timesteps by processing a representation of a respective portion of the input data using a decoder neural network, wherein the decoder neural network is an autoregressive neural network comprising an LSTM subnetwork, a linear transform, and a convolutional subnetwork;

determining, using an autoregressive vocoder neural network and based on the mel-frequency spectrogram, an audio output sample for the time step from among a plurality of possible audio output samples for the time step; and generating an output sequence of audio data based on the audio output samples for the plurality of time steps.

17. The method of claim 16, further comprising:

conditioning the autoregressive vocoder neural network on a current output sequence of audio data comprising respective audio output samples for each preceding time step in the output sequence.

18. The method of claim 16, wherein processing the representation of the respective portion of the input data, comprises:

processing, by an encoder neural network, the input data to generate a feature representation of the input data, wherein the encoder neural network comprises a convolutional subnetwork and a bidirectional long short-term memory (LSTM) layer, and wherein the feature representation is a sequential feature representation that represents a local structure of the input data around a particular character in the input data; and processing, by an attention network, the feature representation, to generate a fixed-length context vector for the time step.

19. The method of claim 16, wherein the autoregressive vocoder neural network, comprises:

a convolutional subnetwork having one or more dilated convolutional layers; and a logistic output layer configured to generate a continuous probability distribution of possible audio output samples.

20. The method of claim 16, wherein:

each of the plurality of time steps corresponds to a respective time in an audio waveform, and wherein the respective audio sample at each of the plurality of time steps is an amplitude value of the audio waveform at the corresponding time step; and a frame length of each mel-frequency spectrogram is 12.5 milliseconds.

* * * * *